US008700267B2

(12) United States Patent
Lange

(10) Patent No.: US 8,700,267 B2
(45) Date of Patent: Apr. 15, 2014

(54) SYSTEM AND METHOD FOR RECEIVING AND RECORDING A CLOSURE PANEL RELEASE REQUEST

(75) Inventor: Richard J. Lange, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1234 days.

(21) Appl. No.: 12/123,294

(22) Filed: May 19, 2008

(65) Prior Publication Data

US 2009/0287379 A1 Nov. 19, 2009

(51) Int. Cl.
*G06F 7/00* (2006.01)
*G06F 17/00* (2006.01)

(52) U.S. Cl.
USPC .................................. 701/49; 701/36; 701/45

(58) Field of Classification Search
None
See application file for complete search history.

(56) References Cited

U.S. PATENT DOCUMENTS

| | | | | |
|---|---|---|---|---|
| 3,785,186 | A * | 1/1974 | James et al. | 70/240 |
| 4,342,209 | A * | 8/1982 | Kleefeldt | 70/264 |
| 5,007,261 | A * | 4/1991 | Quantz | 70/240 |
| 5,040,390 | A * | 8/1991 | Mistry et al. | 70/241 |
| 5,113,182 | A * | 5/1992 | Suman et al. | 340/5.28 |
| 6,145,918 | A * | 11/2000 | Wilbanks, II | 296/146.1 |
| 6,323,565 | B1 * | 11/2001 | Williams et al. | 307/10.1 |
| 6,542,071 | B1 * | 4/2003 | Ohtsubo et al. | 340/426.28 |
| 2003/0038713 | A1 * | 2/2003 | Plude et al. | 340/426 |
| 2007/0295042 | A1 * | 12/2007 | Sattler et al. | 70/237 |

FOREIGN PATENT DOCUMENTS

DE 19632915 A1 11/1997

OTHER PUBLICATIONS

German Office Action for German Application No. 10 2009 020 465.2-22 mailed Feb. 1, 2011.

* cited by examiner

*Primary Examiner* — Khoi Tran
*Assistant Examiner* — Bao Long T Nguyen
(74) *Attorney, Agent, or Firm* — Ingrassia Fisher & Lorenz, P.C.

(57) ABSTRACT

A system and a method are provided for receiving and recording a closure panel release request. The system comprises an input device for transmitting the closure panel release request, a closure mechanism for securing the closure panel in the closed position, and a processor that is coupled to the vehicle, the closure mechanism, and the input device. The processor is configured to receive the closure panel release request and set a condition indicating that the closure panel is released from the closed position.

15 Claims, 5 Drawing Sheets

SYSTEM AND METHOD FOR RECEIVING AND RECORDING A CLOSURE PANEL RELEASE REQUEST

TECHNICAL FIELD

The present invention generally relates to a vehicle closure system, and more particularly relates to a system and method for receiving and recording a closure panel release request.

BACKGROUND OF THE INVENTION

Modern vehicles are often equipped with closure panels, such as one or more doors and/or a rear lift gate, that include latch assemblies for releasing (e.g., unlatching) the closure panel from a closed position electronically. For example, the user of such a vehicle may actuate a control device (e.g., a button on the inside of the vehicle or on a remote key fob) to request that the closure panel be released. In response to this request, the latch assembly releases the closure panel from the vehicle's body, allowing it to be moved away from the closed position.

Such vehicles are also configured with at least one processor to detect when the closure panel is not secured (e.g., latched) in the closed position and alert a user of the vehicle. For example, many vehicles include dashboard display systems that are configured to present a message that one or more of the closure panels is "ajar." Prior art systems determine when a closure panel is not secured in the closed position in at least two ways. First, a sensor may be installed on the periphery of the closure panel itself to detect when the closure panel moves away from the closed position. Alternatively, the latch assembly may include at least one sensor to detect when one of its components, such as a fork bolt, rotates indicating that that the closure panel has moved away from the closed position.

Although the prior art methods for detecting when a closure panel is not secured in the closed position are effective, both methods require the closure panel to move away from the closed position. This may be sufficient during routine operation of the vehicle, as many closure panels are configured to open when they are released. However, environmental and circumstantial conditions may exist that prevent a closure panel from moving away from the closed position when it is released. For example, precipitation such as ice or snow may accumulate on the closure panel, increasing its effective weight and preventing it from opening unless an additional force is provided. Further, weather conditions such as rain, wind, or ice may restrict movement of the closure panel preventing it from opening. In these instances, the closure panel may remain in the closed position after it is released, preventing the prior art methods from determining that it is not secured.

Accordingly, it is desirable to provide a method and an apparatus for detecting when a closure panel is not secured in the closed position, even if the closure panel has not moved away from the closed position. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A system is provided for receiving and recording a closure panel release request. The system comprises an input device for transmitting the closure panel release request, a closure mechanism for securing the closure panel in the closed position, and a processor that is coupled to the vehicle, the closure mechanism, and the input device. The processor is configured to receive the closure panel release request and set a condition indicating that the closure panel is released from the closed position.

A method is provided for receiving and recording a closure panel release request on a vehicle having a closure panel. The method comprises receiving the closure panel release request, setting a condition indicating that the closure panel is not latched in a closed position, and unlatching the closure panel from the closed position.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 5:
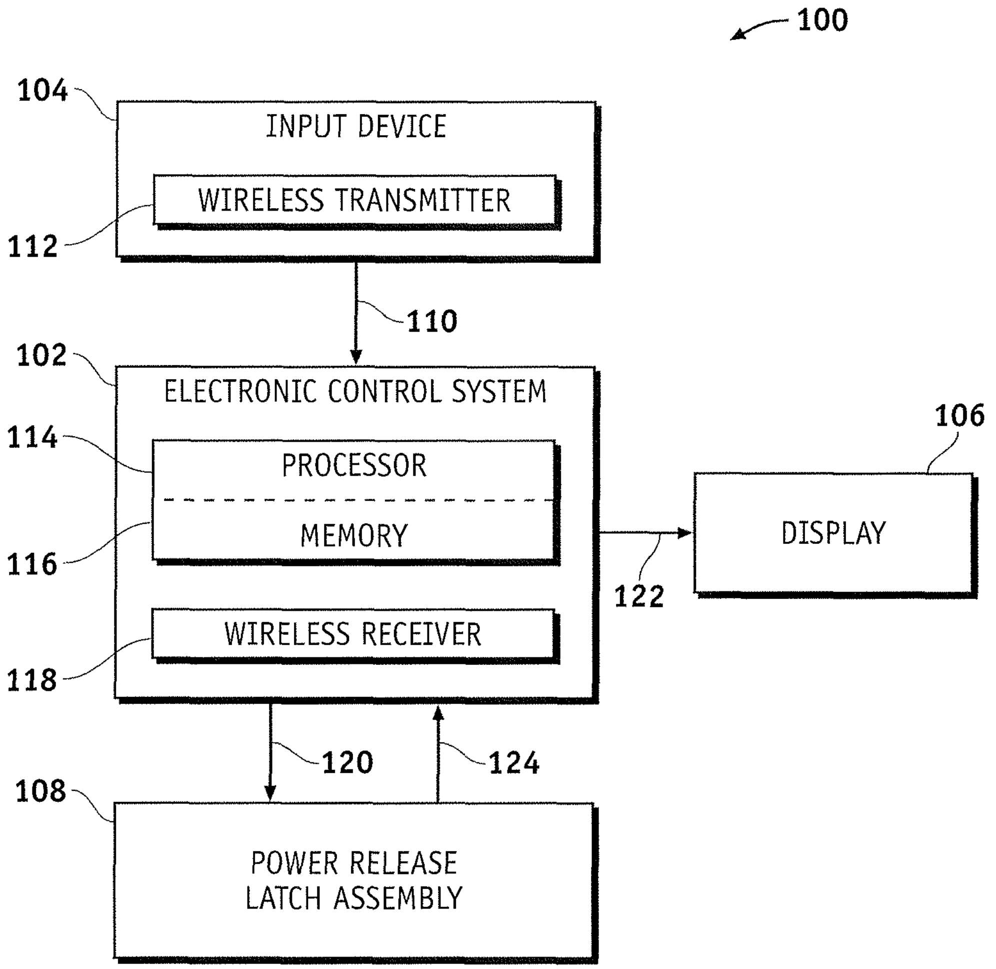
FIG. 5 is a block diagram of an exemplary closure panel system.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component, such as an electronic control system, may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of data transmission protocols and that the system described herein merely illustrates one suitable example. Thus, although the block diagram shown in FIG. 5 depicts one example arrangement of elements, additional intervening elements, devices, features, or components may be present in an embodiment of the depicted subject matter.

Figure 1:
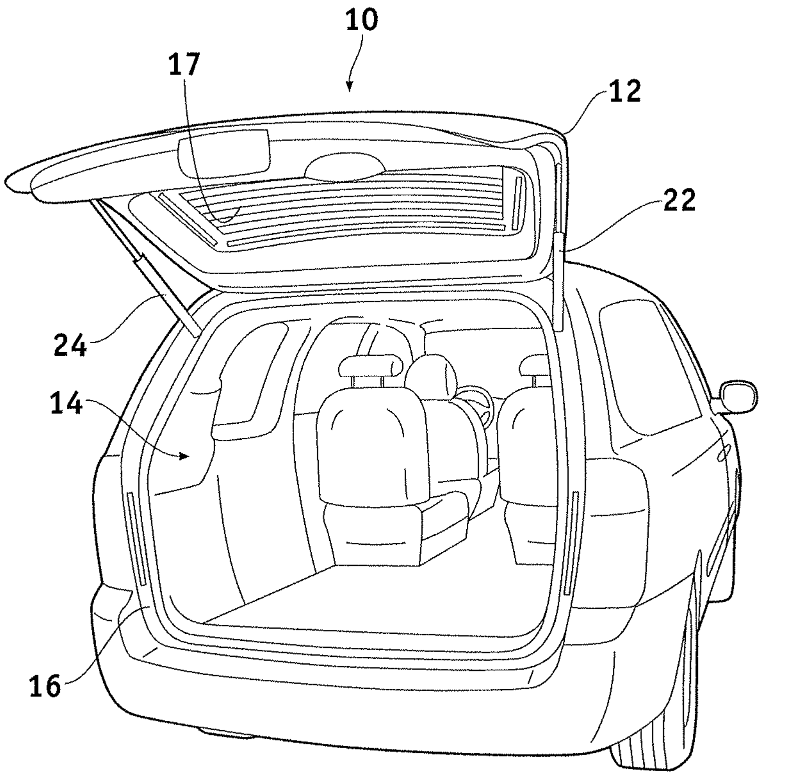
FIG. 1 is an isometric view of a vehicle depicting an open closure panel.
Figure 2:
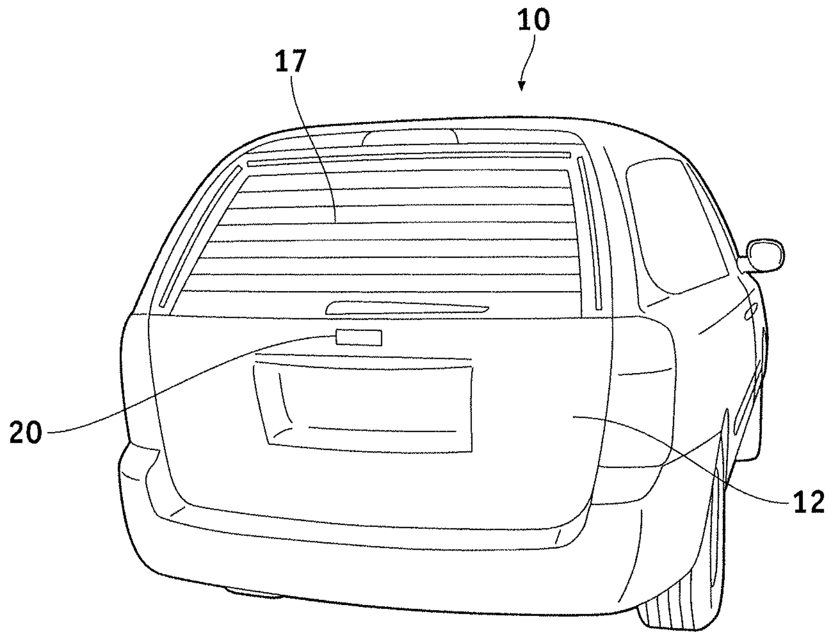
FIG. 2 is an isometric view of the vehicle of FIG. 1 depicting the closure panel in a closed position.

FIGS. 1 and 2 illustrate an exemplary vehicle 10 that is equipped with a closure panel 12 (e.g., a rear lift gate). It should be understood that although the closure panel 12 is depicted as a rear lift gate, the present invention may also be used in connection with other closure panels on the vehicle 10, such as one or more side doors, a trunk door, etc. FIG. 1 depicts the closure panel 12 in an open position and FIG. 2 depicts the closure panel 12 in a closed position. The closure panel 12 can be selectively raised or lowered, and may occupy a range of positions, between the open and closed positions. When raised, access is permitted to the interior of the vehicle 10 through the closure panel entrance 14. When closed, the closure panel 12 may be secured or latched to the vehicle body 16 via a closure mechanism, such as the latch assembly described below with reference to FIGS. 3 and 4, securing the closure panel 12 in the closed position. The closure panel 12 may also include a rear window 17.

In one embodiment, the closure panel 12 is released from the closed position electronically. As a result, the closure panel 12 is no longer secured in the closed position. For example, a user of the vehicle 10 may actuate a key fob or a control device that is coupled to the vehicle 10 such as a button on a console inside the vehicle 10 or a handle 20 that is coupled to the closure panel 12 itself, to provide a signal to the closure mechanism causing it to release the closure panel 12. In other embodiments, the closure mechanism may release the closure panel 12 mechanically. For example, actuating the handle 20 may mechanically move or operate one of the components of the closure mechanism, causing it to release the closure panel 12.

During routine operation, the closure panel 12 moves away from the closed position when it is released. For example, in some embodiments the closure panel 12 is coupled to a non-illustrated motor that moves closure panel 12 to the open position. The motor may also return the closure panel 12 to the closed position in response to an input from the user. In still other embodiments, the closure panel 12 is equipped with certain auxiliary components, such as a plurality of hydraulic pistons 22 and 24 that move the closure pane 12 toward the open position when it is released. The hydraulic pistons 22 and 24 also prevent the closure panel 12 from slamming when it is moved to the closed position by a user.

Figure 3:
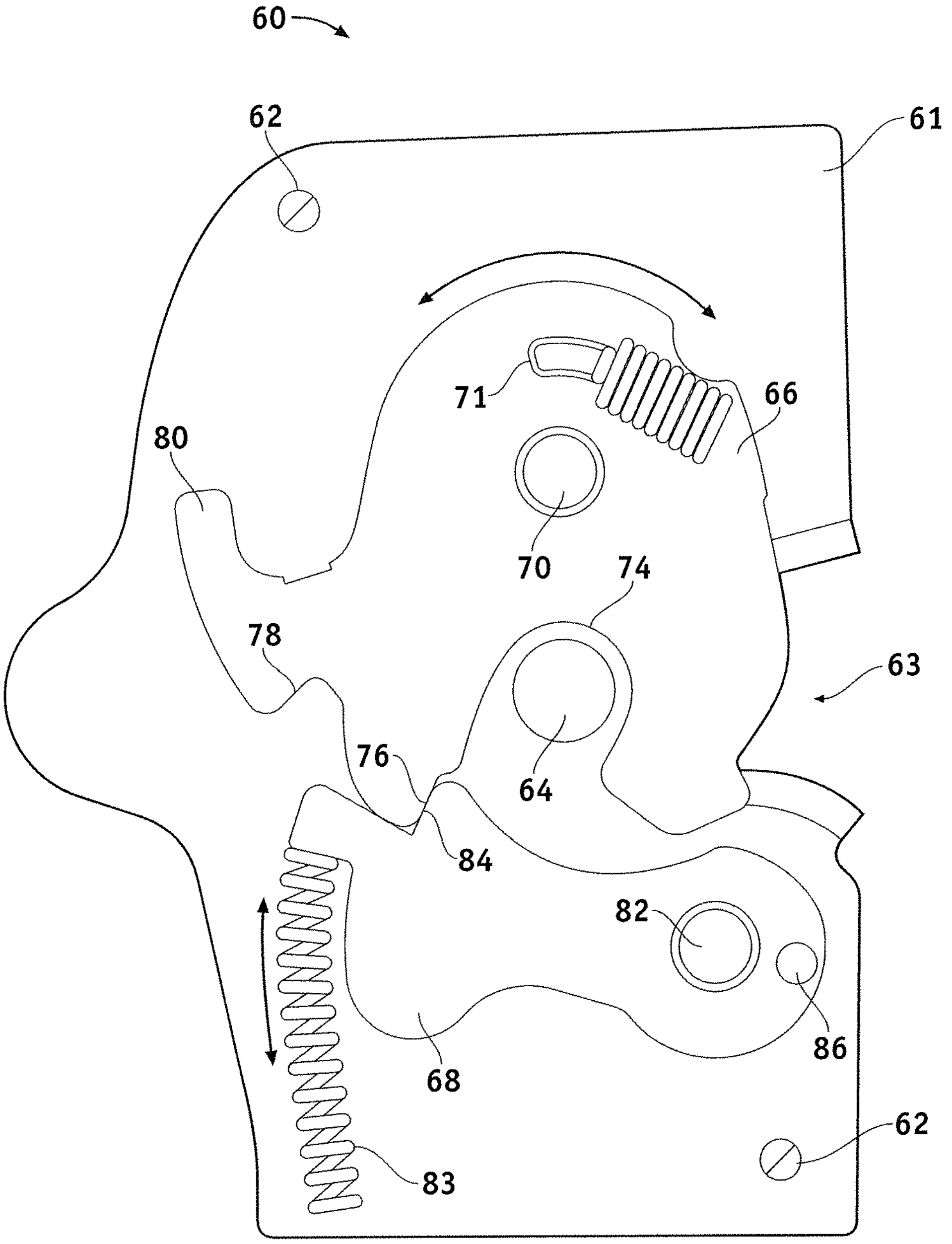
FIG. 3 is a side plan view of a latch assembly in a primary latched position.
Figure 4:
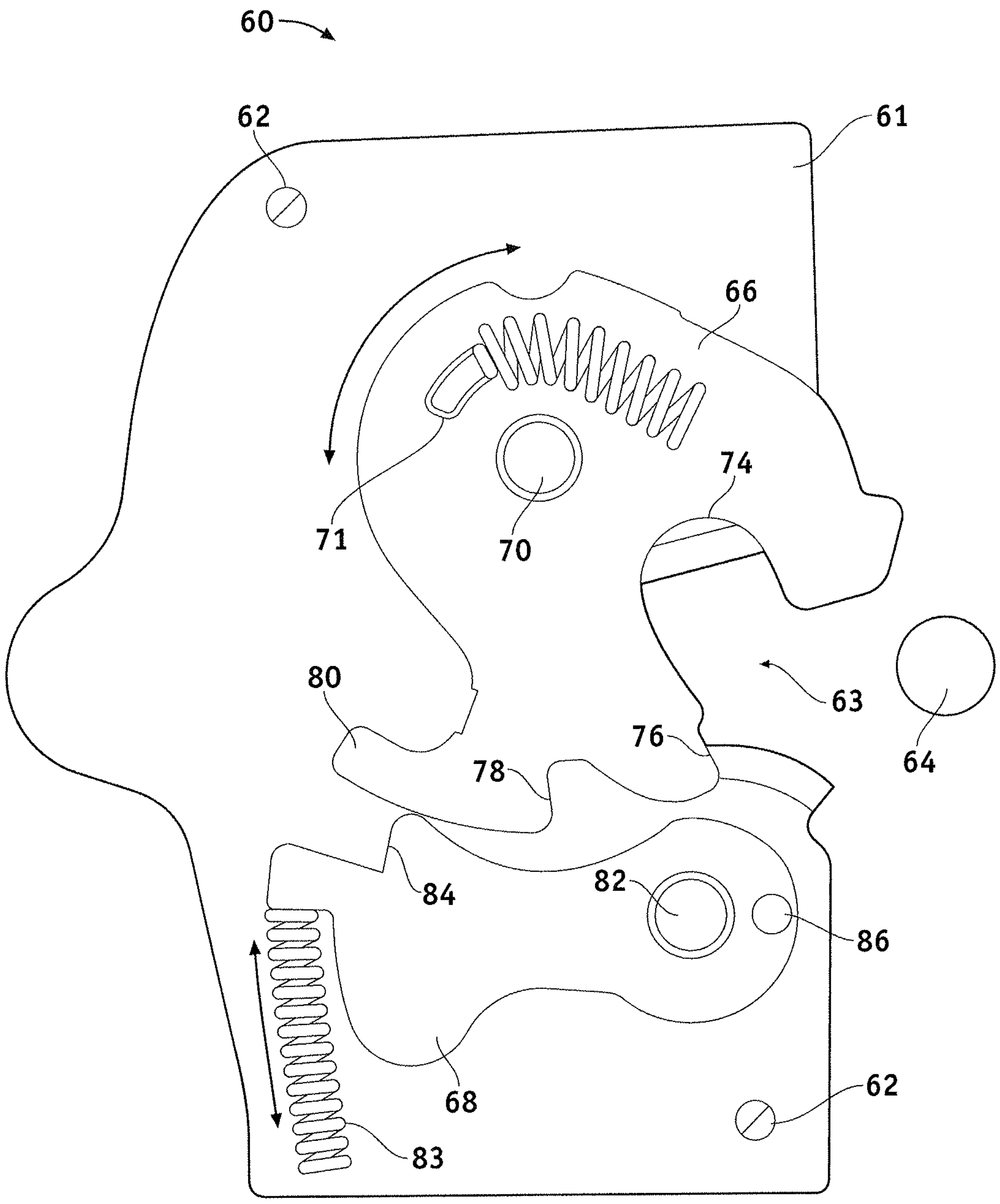
FIG. 4 is a side plan view of the latch assembly of FIG. 3 in an unlatched position.

FIGS. 3 and 4 illustrate an exemplary closure mechanism 60 for latching a closure panel in the closed position. In the depicted embodiment, the closure mechanism 60 comprises a latch assembly, however, it should be understood that other closure mechanisms may also be used with embodiments of the present invention. As depicted, the latch assembly 60 comprises a metal face plate 61 that is coupled to a closure panel of a vehicle (e.g., the closure panel 12 of the vehicle 10 depicted in FIGS. 1 and 2) via a plurality of fasteners 62. The face plate 61 includes a recess 63 for receiving a strike post 64. Strike post 64 is coupled to the vehicle body 16 (FIG. 1) and is retained by the latch assembly 60 when the closure panel is latched in the closed position. A fork bolt 66 and a detent 68 are rotatably coupled to the face plate 61.

Fork bolt 66 is rotatably coupled to the face plate 61 via a post 70. As depicted, fork bolt 66 rotates between a primary latched position (shown in FIG. 3) and an unlatched position (shown in FIG. 4). Fork bolt 66 is biased toward the unlatched position via a spring 71 or other biasing device. Fork bolt 66 also includes a slot or throat 74 for receiving and retaining strike post 64, a primary retaining shoulder 76, a secondary or intermediate retaining shoulder 78, and a foot member 80.

Detent 68 pivots around a post 82 that rotatably couples it to the face plate 61. As depicted, detent 68 rotates between an engaged position (as shown in FIG. 3) and a disengaged position (as shown in FIG. 4). Detent 68 is biased toward the engaged position via a spring 83 or other biasing device. In addition, detent 68 includes a catch 84 for engaging the primary and secondary retaining shoulders 76 and 78 to hold the fork bolt 66 in either a primary latched position or a secondary latched position as further described below. The catch 84 engages the foot member 80 when the fork bolt 66 is in the unlatched position.

As depicted in FIG. 4, when the closure panel is not secured in the closed position, fork bolt 66 sits in the unlatched position and throat 74 is positioned to receive strike post 64. As the closure panel is moved into the closed position, strike post 64 moves into recess 63 of the face plate 61 and engages throat 74, rotating fork bolt 66 clockwise against the bias of the spring 71 and toward the primary latched position.

Catch 84 slides along the periphery of fork bolt 66, as fork bolt 66 rotates clockwise, riding under the foot member 80 and into engagement with the secondary retaining shoulder 78 and then with the primary retaining shoulder 76. The engagement of catch 84 with the secondary retaining shoulder 78 is sufficient to retain the closure panel in a slightly raised position in the event that the closure panel is not shut with sufficient force to allow catch 84 to engage the primary retaining shoulder 76. The engagement of catch 84 with the primary retaining shoulder 76 is sufficient to latch the closure panel in the closed position.

Referring again to FIG. 3, to unlatch the closure panel, detent 68 is moved downward against the bias of the spring 83 to the disengaged position. Fork bolt 66 is then free to rotate counterclockwise toward the unlatched position as the closure panel moves away from the closed position. In some embodiments, detent 68 is retained in the disengaged position (FIG. 4) mechanically or electronically until strike bolt 64 is completely removed from the latch assembly 60 and fork bolt 66 rotates completely to the unlatched position. Detent 68 is then released and moves with the bias of the spring 83 to the engaged position so that it can retain fork bolt 66 when the closure panel is closed. In this case, an unlatched closure panel cannot be retained in the primary latched position or the secondary latched position until it is opened (causing the fork bolt 66 to rotate to the unlatched position and releasing detent 68 from the disengaged position) and closed (allowing the released detent 68 to engage fork bolt 66 and retain it in the primary latched position or the secondary latched position).

Detent 68 may be moved to the disengaged position by any suitable release mechanism. For example, in embodiments in which the latch assembly operates electronically, a non-illustrated motor may engage an outwardly extending arm 86 on detent 68 to move it downward to the disengaged position in response to a request to unlatch the closure panel from a remote key fob or a control device that is coupled to the vehicle. Further, in embodiments in which the latch assembly operates mechanically, detent 68 may be moved to the disengaged position when the user of the vehicle operates a handle (e.g., the handle 20 of FIG. 2) or other control device that is mechanically coupled to detent 68.

As stated previously, the prior art methods for detecting when the closure panel is not secured in the closed position relied on sensors that were placed either on the periphery of the closure panel or on a component of the latch assembly 60, such as the fork bolt 66, to detect movement of the closure panel. However, environmental or circumstantial conditions may prevent the closure panel from moving away from the closed position when it is released. For example, accumulations of ice or snow on the closure panel may increase its effective weight and prevent a motor or a plurality of hydraulic pistons (e.g., the hydraulic pistons 22 and 24 of FIG. 1) from moving it. Further, weather conditions such as wind, ice, or snow may prevent movement of the closure panel when it is released. In these cases, the prior art methods are unable to detect when the closure panel is not secured in the closed position because the closure panel does not move. Consequently, the prior art methods may lead to situations in which the user of the vehicle receives no alert or indication when a closure panel is not secured. In cases where detent 68 is retained, intentionally or unintentionally, in the disengaged position when the closure panel is unlatched this may lead to situations in which the closure panel opens unexpectedly when the environmental or circumstantial conditions that were preventing it from opening no longer exist.

FIG. 5 is a block diagram of an exemplary closure panel system 100. As depicted, system 100 includes an electronic control system 102 that is coupled to at least one input device 104, a display 106, and at least one closure mechanism such as a power release latch assembly 108.

The input device 104 may comprise a button, switch, knob, or other such control device disposed on the interior or exterior of a vehicle (e.g., the vehicle 10 of FIGS. 1 and 2). For example, the input device 104 may comprise a button on a console inside the vehicle 10 that a user actuates to unlatch a closure panel (e.g., the closure panel 12 of FIGS. 1 and 2). Further, the input device 104 may comprise a handle (e.g. the handle 20 of FIG. 2) that is coupled to the closure panel itself. The input device 104 may also comprise a remote key fob that the user actuates from any location within the vicinity of the vehicle to unlatch the closure panel. Upon actuation, the input device 104 transmits the closure panel release request 110 to the electronic control system 102, indicating that a user of the vehicle has requested that the closure panel be released. It should be noted that in instances where the input device 104 is a remote key fob, the input device will include a wireless transmitter 112 and the closure panel release request 110 will be transmitted wirelessly to the electronic control system 102.

The electronic control system 102 includes various sensors and automotive control modules, or electronic control units (ECUs), such as an ignition position sensor (not shown) and a transmission or speed sensor (not shown), and at least one processor 114 and/or a memory 116. Further, in some embodiments, the electronic control system 102 includes a wireless receiver 118 for receiving a closure panel release request 110 that is generated by a remote key fob. The memory 116 includes instructions stored thereon (or in another computer-readable medium) for carrying out the processes associated with the operation of the vehicle. Processor 114 can be a programmable logic control system (PLC), a microprocessor, or any other type of electronic controller known by those skilled in the art. It may be comprised of one or more components of a digital and/or analog type and may be programmable by software and/or firmware, a hardwired state-machine, a combination of these, or any other method known to those skilled in the art. It should be noted that processor 114 and the memory 116 may be shared components among multiple ECUs and/or may both be located on a single ECU. The electronic control unit provides a release signal 120 to the power release latch assembly 108 and an alert signal 122 to the display 106. The display 106 may be a dashboard display that provides a message to the user indicating that the closure panel is "ajar."

The power release latch assembly 108 may comprise a latch assembly (e.g., the latch assembly 60 of FIGS. 3 and 4) including a fork bolt, a detent, and at least one motor to actuate the appropriate assembly components. The power release latch assembly provides a latched signal 124 to the electronic control system 102.

Upon actuation of the input device 104 by a user of the vehicle, the input device 104 sends a closure panel release request 110 to the electronic control system 102. When the electronic control system 102, receives the closure panel release request 110, the processor 114 sets a condition indicating that the closure panel is not secured in the closed position. For example, the processor 114 may set a flag (FLAG) in memory 116 to indicate that the closure panel is unlatched. Processor 114 then transmits the release signal 120 to the power release latch assembly 108 to release the closure panel from the closed position. It should be noted that in embodiments in which the closure mechanism does not operate electronically, the processor 114 will not need to send the release signal 120 because the closure panel is unlatched mechanically by the user.

The processor 114 also provides an alert to the user, via the display 106, when FLAG is set and other predetermined conditions exist. For example, the processor may provide the alert when FLAG is set and the vehicle ignition is turned on. Further, the processor may provide the alert when FLAG is set and the vehicle is traveling at a certain speed or the transmission is engaged. In the depicted embodiment, the processor 114 provides the alert signal 122 to communicate the alert to the user. It should be noted, however, that in other embodiments processor 114 may be configured to provide other types of alerts in this situation, such as an audible alert.

Thus, the processor 114 does not rely on the movement of the closure panel to detect when it is not secured in the closed position. Rather, the processor 114 sets a condition (e.g., FLAG) immediately upon receiving a legitimate closure panel release request 110 and uses the condition to alert the user that the closure panel is not secured in the closed position even if the closure panel does not move when it is released. Consequently, the user of the vehicle is notified that the closure panel is not secured in the closed position and can secure the closure panel so that it will not open unexpectedly.

Upon receiving the release signal 120, the power release latch assembly 108 unlatches the closure panel in the manner described above. In the absence of any impediments, the closure panel moves away from the closed position via a motor, one or more hydraulic pistons, gravity, or any other suitable method.

The power release latch assembly 108 transmits the latched signal 124 whenever the closure panel is latched in the closed position. In one embodiment, the fork bolt is coupled to a sensor that indicates when the fork bolt is rotated into the primary latched position. In this embodiment, the power release latch assembly 108 sends the latched signal 124 when this sensor indicates that the fork bolt has rotated to the primary latched position, indicating that the closure panel has been latched in the closed position.

When the electronic control system 102 receives the latched signal 124, processor 114 resets the condition to indicate that the closure panel is secured in the closed position. For example, the processor 114 may reset FLAG. Resetting FLAG in this manner ensures that the processor 114 does not communicate an erroneous alert to the user.

Figure 6:
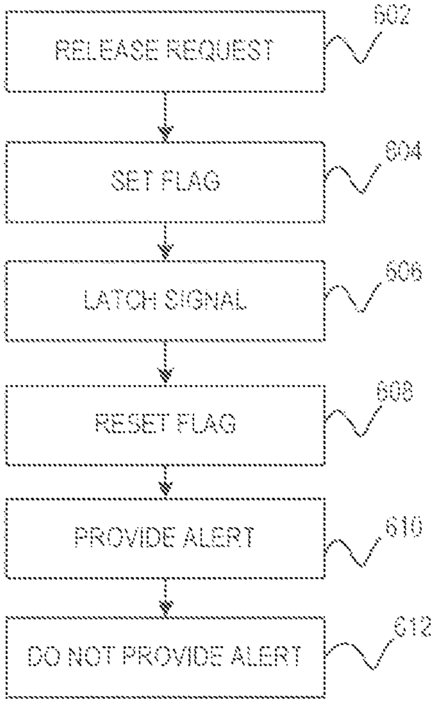
FIG. 6 is a flowchart of a process using the vehicle, systems, and devices of FIGS. 1-5.

FIG. 6 is a flowchart of a process using the vehicle, systems, and devices of FIGS. 1-5, incorporating the features discussed above with respect to FIGS. 1-5. A closure panel release request (also referred to as a closure panel unlatch request) is received (step 602). A flag is set when the closure panel release request is received (step 604). A latch signal is received from the closure mechanism when the closure panel is in the closed position (step 606). The flag is re-set when the latch signal is received (step 608). An alert is provided under certain conditions (step 610). In one embodiment, the alert is provided when the closure panel release request has been received. In one such embodiment, the alert is provided if the flag is set while an additional condition is satisfied. Also, in one such embodiment, the alert is provided when the closure panel release request has been received, the latch signal has not been received, and an additional condition is also satisfied. In one such embodiment, the additional condition is satisfied when an ignition of the vehicle is turned on. In another such embodiment, the additional condition is satisfied when the vehicle is travelling at a predetermined speed. In another such embodiment, the additional condition is satisfied when a transmission of the vehicle is on or engaged. An alert is not provided under certain conditions (step 612). In one embodiment, the alert is not provided when the latch signal has been received. In one such embodiment, the alert is not provided when the flag has been re-set. Also in one embodiment, the alert is not provided if the additional condition of step 610 is not satisfied.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for receiving and recording a closure panel release request on a vehicle having a closure panel, the system comprising:

an input device for transmitting the closure panel release request;

a closure mechanism for securing the closure panel in a closed position; and a processor coupled to the closure mechanism, and the input device, the processor configured to:

receive the closure panel release request;

receive a latch signal from the closure mechanism when the closure panel is in the closed position;

set a flag when the closure panel release request is received;

re-set the flag when the latch signal is received;

provide an alert if the flag is set while an additional condition is satisfied, provided that the flag has not been re-set;

not provide the alert when the additional condition is not satisfied; and not provide the alert when the flag has been re-set.

2. The system of claim 1, wherein the processor is further configured to release the closure panel from the closed position upon receiving the closure panel release request.

3. The system of claim 1, wherein the processor provides the alert even if the closure panel does not move away from the closed position.

4. The system of claim 1, wherein:

the additional condition is satisfied when an ignition of the vehicle is turned on.

5. The system of claim 1, wherein the input device comprises a remote key fob that is wirelessly coupled to the processor.

6. The system of claim 1, wherein the additional condition is satisfied when the vehicle is travelling at a predetermined speed.

7. The system of claim 1, wherein the additional condition is satisfied when a transmission of the vehicle is engaged.

8. The system of claim 1, wherein the closure mechanism comprises a latch assembly for latching the closure panel in the closed position, the latch assembly comprising a fork bolt that is biased to move from a primary latched position to an unlatched position, and the latch signal is provided when the fork bolt is rotated into the primary latched position.

9. The system of claim 8, wherein the latch assembly further comprises:

a detent that restrains the fork bolt in the primary latched position; and a release mechanism for moving the detent to release the fork bolt from the primary latched position.

10. A method for receiving and recording a closure panel unlatch request on a vehicle having a closure panel, the method comprising:

receiving the closure panel unlatch request;

receiving a latch signal from the closure mechanism when the closure panel is in the closed position;

setting a flag when the closure panel unlatch request is received;

re-setting the flag when the latch signal is received;

providing an alert if the flag is set while an additional condition is satisfied, provided that the flag has not been re-set;

not providing the alert when the additional condition is not satisfied; and not providing the alert when the flag has been re-set.

11. The method of claim 10, wherein the closure mechanism comprises a latch assembly for latching the closure panel in the closed position, the latch assembly comprising a fork bolt that is biased to move from a primary latched position to an unlatched position, and the latch signal is provided when the fork bolt is rotated into the primary latched position.

12. The method of claim 10, wherein the alert is provided irrespective of whether there is movement of the closure panel.

13. A closure panel system for alerting a user when a closure panel of a vehicle is not latched in a closed position, the closure panel comprising:

an input device for providing a closure panel unlatch request;

a power release latch assembly for latching the closure panel in the closed position, the power release latch assembly comprising a fork bolt that is biased to move from a primary latched position to an unlatched position, the power release latch assembly configured to provide a latch signal when the fork bolt is rotated into the primary latched position; and a processor coupled to the power release latch assembly, and the input device, the processor configured to:

receive the closure panel unlatch request from the input device;

receive the latch signal from the power release latch assembly;

set a flag when the closure panel unlatch request is received;

re-set the flag when the latch signal is received;

provide an alert if the flag is set while an additional condition is satisfied, provided that the flag has not been re-set; and not provide the alert when the flag has been re-set.

14. The closure panel system of claim 13, wherein the processor is further configured to:

not provide the alert when the additional condition is not satisfied.

15. The closure panel system of claim 13, wherein the alert is provided irrespective of whether there is movement of the closure panel.

* * * * *